(12) United States Patent
Day et al.

(10) Patent No.: US 7,933,223 B2
(45) Date of Patent: Apr. 26, 2011

(54) IN-NETWORK SCHEME FOR INFORMATION TRANSMISSION

(75) Inventors: Peter Stephen Day, St George (GB); Peter Bladon, Wotton under Edge (GB)

(73) Assignee: BAE Systems PLC, London (GB)

( * ) Notice: Subject to any disclaimer, the term of this patent is extended or adjusted under 35 U.S.C. 154(b) by 225 days.

(21) Appl. No.: 11/666,456

(22) PCT Filed: Mar. 23, 2007

(86) PCT No.: PCT/GB2007/001061
§ 371 (c)(1),
(2), (4) Date: Apr. 27, 2007

(87) PCT Pub. No.: WO2007/110607
PCT Pub. Date: Oct. 4, 2007

(65) Prior Publication Data
US 2009/0141658 A1    Jun. 4, 2009

(30) Foreign Application Priority Data

Mar. 24, 2006  (EP) ..................................... 06251615
Mar. 24, 2006  (GB) ................................... 0605892.9

(51) Int. Cl.
*H04L 12/00* (2006.01)
*G06N 5/00* (2006.01)
(52) U.S. Cl. .......................................... 370/254; 706/45
(58) Field of Classification Search ........................ None
See application file for complete search history.

(56) References Cited

U.S. PATENT DOCUMENTS

| 6,076,083 A * | 6/2000 | Baker .............................. 706/52 |
| 6,862,561 B2 * | 3/2005 | Defranoux et al. ............. 703/11 |
| 2007/0253341 A1 * | 11/2007 | Atkinson et al. .............. 370/252 |
| 2008/0077621 A1 * | 3/2008 | Borgsmidt et al. ........ 707/104.1 |
| 2009/0059814 A1 * | 3/2009 | Nixon et al. ................... 370/254 |

FOREIGN PATENT DOCUMENTS

| EP | 1 160 679 A2 | 12/2001 |
| EP | 1 589 473 A2 | 10/2006 |
| JP | 2004343534 | 12/2004 |
| JP | 2007089149 | 4/2007 |

(Continued)

OTHER PUBLICATIONS

Paskin M. et al: "A robust architecture for distributed reference in sensor networks" Apr. 25, 2005, pp. 55-62, XP010807198 ISBN: 0-7803-9201-9 *abstract*.

(Continued)

*Primary Examiner* — Jayanti K Patel
*Assistant Examiner* — Matthew Campbell
(74) *Attorney, Agent, or Firm* — Buchanan Ingersoll & Rooney PC (57) ABSTRACT

A method and means for processing information across a network is provided, the network comprising a plurality of nodes. In one embodiment, the invention includes algorithm means for addressing the problem of efficient information distribution between nodes in the network. This invention addresses the problem by generating probabilistic models at the nodes in the network and by selectively distributing information between the nodes based on these models and by using a predetermined metric function in such a way as to reduce information differences between the nodes.

Advantageously this invention finds utility in many applications in both distributed networks and centralised networks provided that it is possible to derive an appropriate tree topology representation of the network.

17 Claims, 9 Drawing Sheets

FOREIGN PATENT DOCUMENTS

WO     WO 02/071255 A3     9/2002

OTHER PUBLICATIONS

David Heckerman et al. "Causal Independence for Probability Assessment and Inference Using Bayesian Networks" vol. 26, No. 6 Nov. 1996, XP011056057 ISSN: 1083-4427 *the whole document*.

Makarenko A et al: "Decentralized data fusion and control in active sensor networks" vol. 1, 2004, pp. 479-486vol.1, XP002335208 *p. 1, left-hand col., line 1-p. 5, right-hand col., paragraph 2*.

Hart D M et al: "Reducing swarming theory to practice for UAV control" Mar. 6, 2004, pp. 3050-3063, XP010748434 ISBN: 0-7803-8155-6 *abstract* p. 3058, right hand col., paragraph 4-p. 3059, left-hand col., paragraph 4*.

Jensen F V: "Bayesian Networks Basics" AISB Quarterly, SL, GB, No. 94, Dec. 21, 1995, pp. 9-22, ISSN: 0268-4179 *the whole document*.

International Search Report Application No. PCT/GB2007/001061 dated Jul. 27, 2007.

Gallager et al, "A distributed algorithm for minimum weight spanning trees", ACM Transactions on Programming Languages and Systems, Jan. 1983, 15 pages.

Kall et al, Stochastic Programming, Second Edition, John Wiley & Sons, Chichester, 1994, pp. 1-317.

Liu et al, "Collaborative In-Network Processing for Target Tracking", EURASIP Journal on Applied Signal Processing 2003:4, 378-391, 2003 Hindawi Publishing Corporation, pp. 378-391.

MacKay, David J.C., "Information Theory, Inference, and Learning Algorithms", Cambridge University Press, 2003, pp. 1-628.

Nettleton, Eric, "Decentralised architectures for Tracking and Navigation with Multiple Flight Vehicles", Australian Centre for Field Robotics, Department of Aerospace, Mechanical and Mechatronic Engineering, The University of Sydney, 2003, pp. 1-244.

Paskin, Mark A., "Robust Probabilistic Inference in Distributed Systems", Computer Science Division, University of California, Berkeley, In Proceedings of the Twentieth Conference on Uncertainty in Artificial Intelligence (UAI-04), 2004, 10 pages.

Xiang et al, "Inference in Multiply Sectioned Bayesian Networks with Extended Shafer-Shenoy and Lazy Propagation", Department of Computer Science, University of Regina, Regina, Saskatchewan, Canada, S4S 0A2, Proceedings of the Fifteenth Conference on Uncertainty in Modelling Intelligence, (UAI-99) Stockholm, Sweden, 1999, 8 pages.

International Preliminary Report on Patentability dated Sep. 30, 2008 for corresponding PCT Application No. PCT/GB2007/001061, 10 pages.

Lauritzen et al, "Local computations with probabilities on graphical structures and their application to expert systems", *J. Royal Statistics Society B*, 50(2): pp. 157-194, 1988.

Pearl, *"Probabilistic Reasoning in Intelligent Systems: Networks of Plausible Inference"*, Morgan Kaufman, San Mateo, CA, 1988, pp. 29-75.

Puterman, *"Markov Decision Processes"*, John Wiley and Sons, 1994, pp. 16-440.

Kawahigashi, Haruko "Application of the Random Graph Theory to Sensor Networks" Journal of Institute of Electronics, Information and Communication Engineers, vol. 89, No. 5, May 1, 2006, pp. 374-378.

\* cited by examiner

IN-NETWORK SCHEME FOR INFORMATION TRANSMISSION

FIELD OF THE INVENTION

This invention relates to a method and means for processing information across a network, the network comprising a plurality of nodes. Each node has means for receiving and sending information and means for processing information. The invention is particularly concerned with a method of decision making that is applied in such a network. The invention addresses the problem of distributing information in such a network in an efficient manner.

BACKGROUND OF THE INVENTION

Examples of networks over which one may wish to solve the problem of distributing information efficiently may be found in a variety of fields, including commerce, telecommunications, robotics, and military applications where a network of sensor nodes track targets. Various algorithms have been proposed for achieving solutions to this problem. The algorithms for solving this problem over a network fall into two classes:

Centralised Algorithms—for this class of algorithm, there is a requirement that all data be sent to a single node. The processing occurs at that node and the solution is sent out to all nodes. Because all decisions are taken in one place, the decisions (and the information upon which they are based) are consistent and can be easily coordinated. However, known centralised algorithms are not robust and do not scale well with network size. They are not robust since the removal of the central node causes complete failure. They do not scale well as the number of messages that must be sent down a given link will tend to grow with network size (or the number of links to the central node will grow).

Distributed Algorithms—this applies to an architecture in which decisions concerning sensing, manoeuvring and communicating are made locally, even when in pursuit of some global goal.

Advantages: a distributed system has inherent robustness; potentially it has minimal time lag between decision and local action; and resource consumption patterns are more even, providing flexible deployment options.

Disadvantages: for known algorithms, the decisions made at different points may be inconsistent; co-ordination must be enabled across the network.

The inventors have recognised that the principal shortfalls of distributed decision making can be mitigated by designing better algorithms (to be described hereinafter) ensuring decisions are consistent, by providing consistent information to decision makers in an efficient way, by ensuring local and global goals are aligned and by developing better co-ordination strategies.

Computational Strategy In-Network or On-Network?

One way of thinking of a distributed system is to view it as a set of processors connected by a network that executes algorithms for fusion and decision making. The design decisions are then simple (in principle) and relate to provisioning the processing required by the algorithms and designing networks to cope with expected distribution of information sources and consumers.

An alternative is to adopt a more holistic view and consider computation to be a function of the distributed system itself. This provides the opportunity to develop algorithms that are more flexible and more efficient than simply replicating algorithms over a network. In the sensor network literature this is termed "In-Network" computation, for example see Reference [1]. By analogy, the former option is called "On-Network" computation.

It is instructive to consider now the scalability and resource efficiency of two hypothetical schemes for processing and communicating information in a network, one an In-Network solution, the other an On-network and construct a scaling-argument in favour of the In-Network case.

In this regard, it is instructive to consider two cases for a system composed of nodes (e.g. physical platforms) that originate data (e.g. from sensors or intelligence sources) that is processed and exploited at different points in the network.

Case 1: information is exploited at every node (supporting a distributed decision making algorithm where every node makes decisions using the same data).

Case 2: information is exploited by a single node in the network (supporting a centralised decision scheme).

Case 1: Information Exploitation at Every Node

Figure 1A:
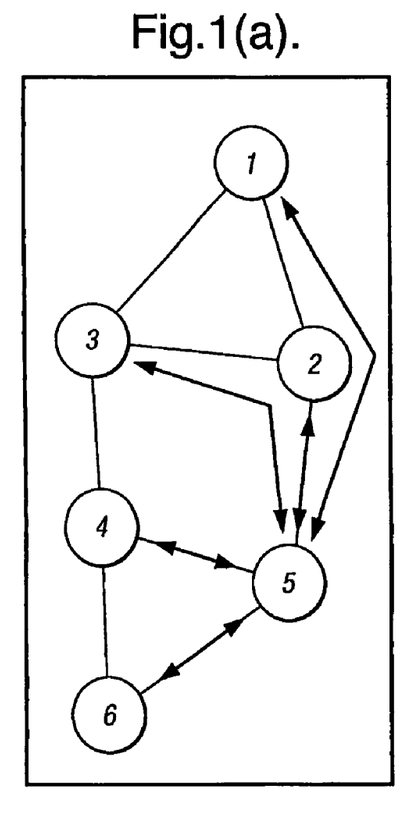

On-Network Computation: Define $R_o$ the rate at which a node produces data packets of fixed size $S_o$. Then the total amount of data produced per unit time scales as $N^2 R_0$, where N is the number of agents in the system, and the bandwidth consumption is $N^2 R_o S_o$—see FIG. 1(a).

In-Network Computation: Suppose a node can produce processed information, at a controlled rate, in packets of size $S_1$, that summarises the raw data received to date. The node then sends this information to other nodes. On receiving a message containing new information, a node can integrate this information into the next message sent to other nodes—see FIG. 1(b). If the network is tree-like (has N−1 links), and each node generates messages at rate $R_I$, then the total bandwidth used is $NR_I S_I$—see FIG. 1(b).

Therefore the In-Network solution has lower resource usage when $$R_I S_I \ll N R_o S_O,$$

assuming the timeliness and accuracy of the two solutions are identical. Furthermore, the In-Network solution can control the rate at which it sends without losing information (if it sends accurate summaries of data) giving it the ability to control its emissions to match EMCON requirements.

Case 2: Information Exploitation at a Single Node

On-Network Computation: If a single node needs to receive information from all others, the total network resource used per message will be proportional to the path length of each message, say $N^\alpha$, where $\alpha<1$ which is bounded by N. Then, the total network resource utilised is $N^{\alpha+1} R_o S_o$.

In-Network Computation: For this case, the same scaling can be adopted again as before i.e. resource consumption scales as $NR_I S_I$. In this case, information is produced at every node, but only consumed at one node.

Therefore, assuming $\alpha$ is zero (favourable to the On-Network case) preference of one strategy over another is solely dependent on the ratio $$R_I S_I / R_o S_o,$$

so that even in a centralised application, there may be benefits to be derived from a smart In-Network computational approach. The inventors' approach to an In-Network solution is demonstrated hereinafter.

Technical Challenges

It is now instructive to turn one's focus to the implementation of distributed decision making algorithms using Bayesian Decision Theory. This allows current and future state uncertainty to be treated consistently within the Bayesian paradigm, and allows decisions to be weighted according to cost or reward, as defined by some utility function (see Reference [2]). Formally, Bayesian decision theory generalises stochastic programming (see Reference [3]) and Markov Decision Processes (see Reference [4]), and other techniques used for decision making under uncertainty.

Within this framework, the goal of the information gathering system is to make a series of local decisions (e.g. sense, communicate, manoeuvre) to maximise the total utility of the data gathered:

$$\underset{a}{\operatorname{argmax}} \sum_X U(X, a) P(X \mid z, a) \quad (1)$$

where $X=\{X_1, \ldots, X_N\}$ is the set of variables that describe the world, $U(X,a)$ is a utility or relevance function and a and z denote a set of actions and observations respectively. In this specification a bold font is used to indicate a set, and a normal font to indicate a member of the set. Lower case will be used to indicate a particular element drawn from a set. Hence $z=\{z_1=Z_j, z_2=Z_k, \ldots, z_N=Z_Q\}$ represents a set of observations drawn from Z and $a=\{a_1=A_j, a_2=A_k, \ldots, a_N=A_Q\}$ a set of actions drawn from A. The probability distribution $P(X|z,a)$ therefore represents the state of knowledge of the world, given a set of actions a and observations z. In the sections hereinafter the challenges of implementing Bayesian decision theory in the inventors' proposed application are explored.

Distribution of Information

Equation (1) above describes the optimisation of a utility function in which information about the current state $P(X|z,a)$ and the utility function are available concurrently.

According to the inventors' application, each node has to maintain its own model of the world, which differs between nodes only in the information used to update the initial prior model. However, if the models differ appreciably between nodes, then the potential exists that the decisions made by any two models will be inconsistent.

OBJECTS AND SUMMARY OF THE INVENTION

It is an object of the present invention to provide a method and means for processing information from a network of nodes that solves the problem of distributing information in such a network in an efficient manner.

It is another object of the present invention to provide a method and means for decision making in a network of nodes enabling decisions to be made at different nodes whilst taking into account information differences between the nodes.

In broad terms, the present invention resides in the concept of generating probabilistic models at different nodes in a network and selectively distributing information between the nodes based on these models so as to reduce information differences between the nodes.

More particularly, according to the present invention there is provided a method of decision making that is applied in a network comprising a plurality of nodes, each node having means for receiving and sending information and means for processing information, and each node being linked to selected other nodes of the network, the method comprising: (i) providing a tree representation of the nodes and establishing therefrom for each of the nodes (a) a node model comprising a probability distribution of node component probability factors to represent the node state and (b) at least one node link model comprising a probability distribution of link component probability factors to represent the state of each node link associated with each node via which information can be communicated to selected other nodes, (ii) in response to receiving new information at one or more of the nodes, updating the corresponding node models that are maintained at said one or more of the nodes, (iii) in response to detecting the availability of a node link which links a node pair in the network, selecting a combination of node component probability factors and link component probability factors associated with said node pair and its node link by calculating the contributions that various possible combinations of node component probability factors and link component probability factors would make to a predetermined function which measures the difference between the node models and the node link models for said node pair and its node link and by selecting that combination of probability factors amongst the various possible combinations of probability factors which provides the largest calculated contribution to said predetermined function, (iv) transferring said selected combination of node component probability factors and link component probability factors from the originating node to the receiving node via said node link thereby reducing information differences between the nodes and updating the corresponding node models and the node link models that are maintained at the nodes, and (v) independently reconciling the node models and the node link models associated with the nodes in the network so as to take account of the transferring step (iv).

Optionally, the method includes a step (vi) of repeating the aforesaid steps (i), (ii), (iii), (iv) and (v) in a series of time steps as an iterative procedure.

Conveniently, the aforesaid step (ii) and aforesaid steps (iii) to (v) are effected in accordance with different procedures asynchronously.

In accordance with an exemplary embodiment of the invention which will be described hereinafter in detail, there are provided a plurality of node links at a first node and single node links at a second and third node, the first node being linked separately to the second and third nodes via node links, and the aforesaid steps (iii) to (v) of the method being effective contemporaneously for each of the node links and associated node link models.

Preferably, the predetermined function is the Kullback-Leibler (KL) divergence metric function. It is to be appreciated however that other types of function could be used in the method instead, if desired, as a measure of the difference between the node models and the node link models.

Optionally, the method includes a step of basing the node models and the node link models on a Bayesian network probabilistic model. It is to be appreciated that the node models and the node link models could equally be based on other kinds of probabilistic model if desired, for example the Markov Random field probabilistic model could be used as a basis model.

The invention requires to be implemented over a lossless network protocol—a lossless TCP network protocol is used in the preferred embodiment.

The invention in at least a preferred embodiment includes algorithm means for solving the problem of efficient information distribution between nodes in the network. Thus, this invention resides in a computer program comprising program code means for performing the method steps described hereinabove when the program is run on a computer.

Furthermore, this invention resides in a computer program product comprising program code means stored on a computer readable medium for performing the method steps described hereinabove when the program is run on a computer. As will be described hereinafter, the algorithmic steps can be effectively implemented at the node sites in the network.

Furthermore, this invention extends to an autonomous system for gathering and controlling the distribution of information comprising a plurality of platforms (e.g. UAVs) distributed in space adapted and arranged in such a way as to carry out the method steps described hereinabove.

This invention has utility for many network applications where efficient information distribution is a top priority. Notably, the invention can be applied in centralised networks as well as in distributed networks, provided that it is possible to derive a tree topology representation for the network.

The above and further features of the invention are set forth with particularity in the appended claims and will be described hereinafter with reference to the accompanying drawings.

BRIEF DESCRIPTION OF THE DRAWINGS

FIG. 1 shows how information flows in a network as applied to (a) an On-Network solution, showing the flows into and out of Node 5 (not shown are the other 11 message flows connecting all other pairs of nodes) and (b) an In-Network solution, where each node processes information received and updates other nodes (in this Figure all flows in the network are shown);

DESCRIPTION OF PREFERRED EMBODIMENT

An In-Network Scheme for Information Transmission

The invention in at least a preferred embodiment includes a distributed In-Network algorithm for reconciling information between nodes that is scaleable and efficient. The algorithm utilises a local utility function, defined between pairs of nodes, that is used to control information transmission that, in the converged limit, satisfies a global objective function.

The inventors have found that the algorithm is always as efficient as any that passes observation data around the network (i.e. the equivalent On-Network algorithm). It leads to lower utilisation when sufficient bandwidth is available and greater accuracy and more timely transfer of information when bandwidth is limited.

The idea is based on exploiting message-passing algorithms used for inference in Bayesian networks (see Reference [5]—usually used for inference within a particular graphical model e.g. for inference at a particular node) between models located in separate locations. A key development made by the inventors as described hereinafter is the representation of the whole system as a "junction tree of junction trees" and the utilisation of an efficient information distribution scheme for deciding which piece of information is the most important to send.

The inventors' approach differs from known work in that the invention is particularly concerned with applications for controlling sensing and communication, where the inference model is replicated across the system i.e. every agent holds a copy. This is different in operation for example from the known approach of Paskin and Guestrin (see Reference [6]) and Xiang and Jensen (see Reference [7]), who consider distributing a single inference calculation (i.e. the model is distributed) across, respectively, a sensor network and parallel computer.

Figure 2:
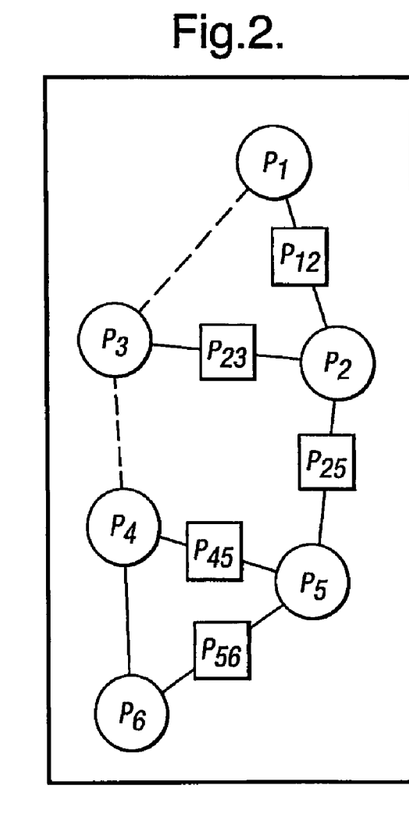
FIG. 2 is a diagram of a network junction tree when overlaid onto a physical network.

To understand the invention, it is instructive to begin by discussing a basic message passing algorithm for inference in undirected graphical models (see Reference [8]), and then by showing how this is inventively modified and further inventively implemented by the inventors across a physical network architecture. Consider first a network with algorithm means in which the first step of the algorithm is to construct an overlay network with a tree topology. A copy of the prior distribution is then stored (i.e. knowledge of the world before any observations are made) at each node (labelled $P_i$) and each edge of the network (labelled $P_{ij}$). The resultant distribution of information around the network is shown in FIG. 2. One can then express the prior distribution for the whole system (which we denote by $P_{cent}(X)$ representing a "centralised solution") as $$P_{cent}(X) = \frac{P_1(X)P_2(X)P_3(X)P_4(X)P_5(X)P_6(X)}{P_{12}(X)P_{23}(X)P_{25}(X)P_{45}(X)P_{56}(X)} \quad (2)$$

Essentially, a junction tree representation of the probability distribution of the whole system is thus constructed, with a topology supported by the underlying physical sensor network.

Now suppose an observation is made at Node 1: multiply both sides by $P(z_1|X)$, giving $P_{cent}=P_1=P(X,z_1)$. It is possible to see why the LHS of Equation (2) above is called a centralised solution: it corresponds to a sensor network where observations are transferred instantly to a common location. It also provides a natural reference model to compare against the distributed solution. The probability distribution at Node 1 is now inconsistent with the distributions in rest of the system. To reconcile the distribution with Node 2, Node 1 can "send a message" to Node 2, which corresponds to performing the following actions on the RHS of Equation 2.

$$P_2 \rightarrow P_1/P_{12}$$

$$P_{12} \rightarrow P_1.$$

It can be seen that this leaves the RHS invariant, so that the total system computes $P(X,z_1)$, and reconciles $P_2$ with $P_1$. Repeating this procedure across the network ultimately results in every distribution being consistent with each other, and hence consistent with $P_{cent}$. This takes a number of messages that is proportional to the tree-width of the physical network. An important consequence of this algorithm application for distributed inference is that even when the distributions at different nodes are inconsistent, all information is retained somewhere in the system: the system is information preserving.

However, the inventors have recognised that adopting the above described algorithm does not solve the general problem of efficient information distribution in a network. If P(X) is complex (i.e. it has a high dimensional state space) then the amount of data that must be transmitted is equal to the size of the state space.

Figure 3A:
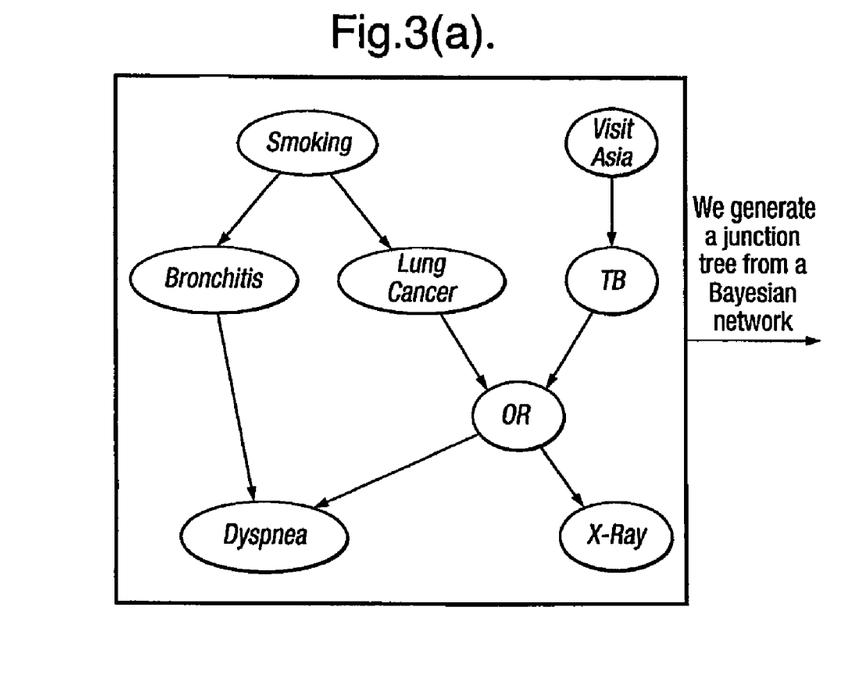
FIG. 3(a) is a diagram of the "Asia" Bayesian network.
Figure 3B:
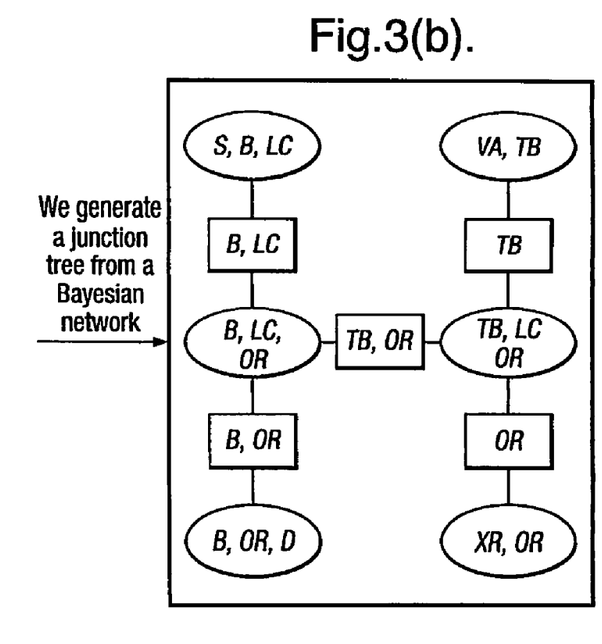
FIG. 3(b) is a junction tree representation of the network of FIG. 3(a)

The inventors have further recognised that using a suitable graphical model representation of each node and its node link(s) is much more compact than the full state space. In practice, inference in Bayesian networks is also performed in a junction tree. This is derived from the Bayesian network via series of transformations of the directed graph of the Bayesian network. FIG. 3 by way of example shows the hypothetical medical diagnosis Bayesian network "Asia" and its junction tree (see Reference [9]). The junction tree representation of a probability distribution is then denoted by $$P(X) = \frac{\prod_c \phi(X_c)}{\prod_c \phi(X_s)}$$

To maintain the distinction between the two junction trees under discussion (the physical network junction tree and the graphical model junction tree) we refer in this specification to the component probability factors of the graphical model as "clique" and "sepset" distributions (equivalent to node and node link distributions in the physical network model) which we denote by $\phi(X_C)$ where C indexes the cliques in the junction tree and by $\phi(X_S)$ where S indicates the separating sets (or "sepsets") of variables in the junction tree.

This type of junction tree representation of the graphical model is used in the embodiments of the invention. It notably can be used to make the In-Network protocol efficient, as the information contained within a model (about observations) can be communicated incrementally via the communication of individual cliques or sepsets across a node link from one node to another node.

Figure 3C:
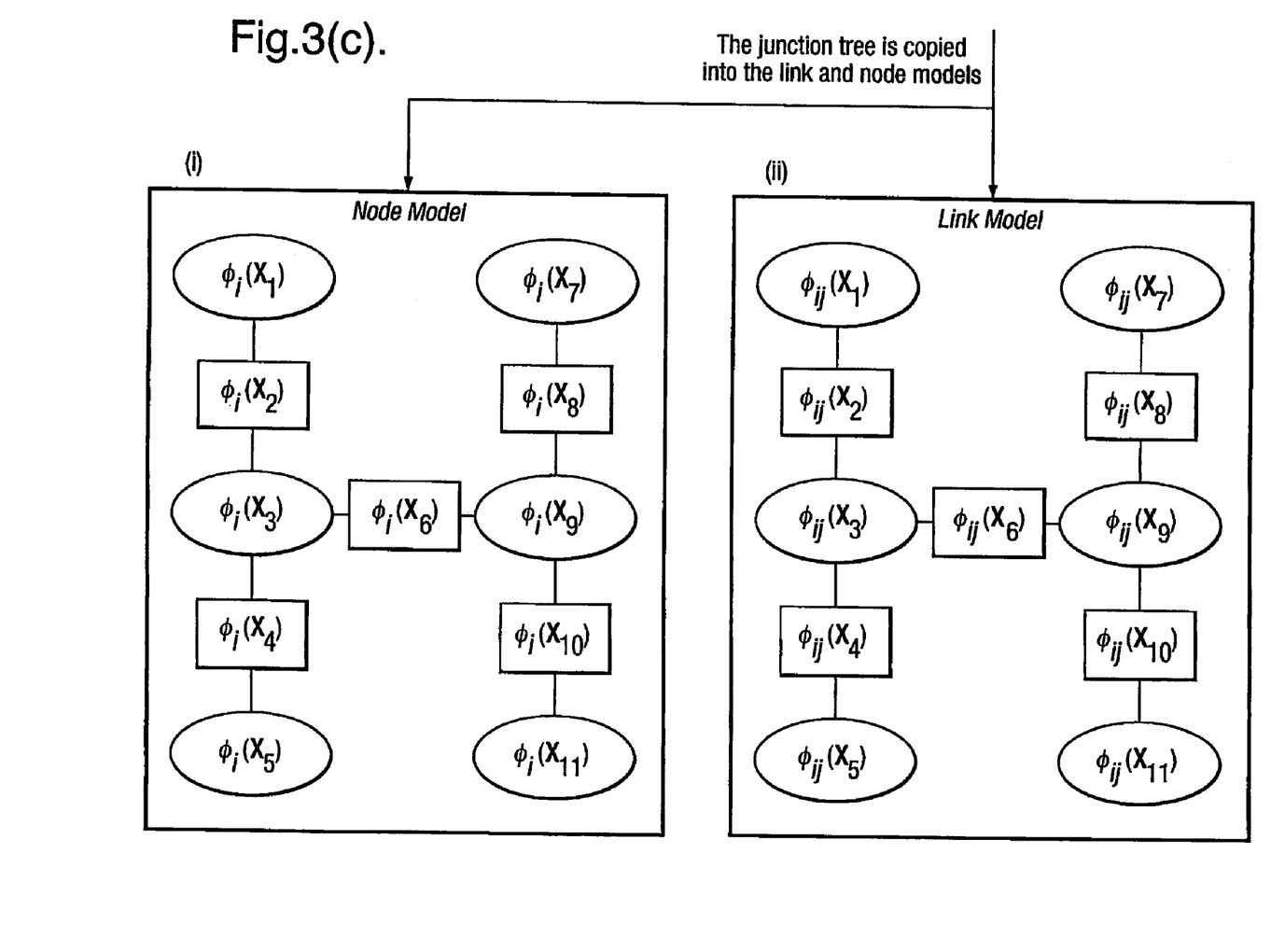
FIG. 3(c) is a diagram of the node model and the link model corresponding to the network of FIG. 3(a) when its junction tree representation is copied into the link and node models, the node model of FIG. 3(c)(i) being shown to be composed of a probability distribution of node component probability factors and the link model of FIG. 3(c)(ii) being shown to be composed of a probability distribution of link component probability factors.

Having regard to the foregoing, it is thus possible to provide in the embodiments of the invention a suitable junction tree representation of the nodes and establishing from this for each of the nodes in the network (a) a node model comprising a probability distribution of node component probability factors (see $\phi(X_C)$ components in FIG. 3(c)) to represent the node state and (b) one or more node link models comprising a probability distribution of link component probability factors (see $\phi(X_S)$ components in FIG. 3(c)) to represent the state of each node link associated with each node.

However, it is still necessary to decide on which clique/sepset to send. Note that in the In-Network protocol, the information maintained on a particular link (i.e. the sepset in junction tree language) contains the most up-to-date history of information common to the linked nodes. The inventors have recognised that a distance between the node and node link distributions is representative of the distance between the two node distributions and that minimising this distance measure provides a means to select among the different possible cliques/sepsets.

The Kullback-Leibler (KL) divergence is a used measure for the dissimilarity of two probability distributions, and is defined as $$KL(P(X)\|Q(X)) = \sum_X P(X)\log P(X)/Q(X).$$

For a distribution that factors across cliques and sepsets of the node ($P_i$) and link distributions ($P_{ij}$):

$$KL(P_i(X)\|P_{ij}(X)) = \sum_C \sum_{X_C} \phi_i(X_C)\log\phi_i(X_C)/\phi_{ij}(X_C) - \\ \sum_S \sum_{X_S} \phi_i(X_S)\log\phi_i(X_S)/\phi_{ij}(X_S) \\ = \sum_C KL(\phi_i(X_C)\|\phi_{ij}(X_C)) - \\ \sum_S KL(\phi_i(X_S)\|\phi_{ij}(X_S)).$$

This formulation is adopted in the preferred embodiment and it allows the efficient evaluation of the total KL divergence. In this embodiment, by performing local calculations of the individual clique KL divergences, the inventors have been able to identify cliques/sepsets which make the largest contribution to the total KL divergence and hence prioritise the transfer of cliques/sepsets according to this metric across a node link from one node to another.

Another issue relating to efficiency as recognised by the inventors, is the size of the cliques compared to the size an observation. In a probabilistic modelling process, a single observation (resulting in a vector) is modelled as a likelihood function that is conditioned on the true state of a subset of the model domain $X_0$. In a Bayesian network, this corresponds to a series of directed arcs entering node Z—see for example the Dyspnea node shown in FIG. 3(a), which has parents OR and Bronchitis. In the shown junction tree, this manifests itself as a clique containing both sets of variables, {B,OR,D}) in FIG. 3(b). These cliques which separate observations from state variables summarise the effect of observations and provide the conduit for observations to flow into the rest of the model. The size of these cliques is (in the discrete case) $\|Z\|\times\|X_0\|$.

How does this size compare to an observation or other information input? The inventors have found that to a large extent, this depends on the particular application. For some data sources, for example unprocessed images, the size of the raw data may be very significant compared to the dimensionality of the likelihood function extracted from it (e.g. a feature vector). In other cases (for example a processed detection from a Radar in the form of a position vector) the observation may be more compact than the likelihood function.

However, before an observation can be successfully processed by a probabilistic model, it requires to be turned into a likelihood model, and for many cases this processing depends on ancillary information (e.g. the position and error of the sensing platform, the type of platform, the type of sensor, etc). To construct a system with fewest dependencies, it is proposed by the inventors that one would not wish to construct a system in which one platform relied on extensive knowledge about another platform. In other words in any distributed system, one would always transmit likelihood functions. Hence the dimensionality of observations and the observation summarising cliques is always the same.

Before the steps involved in the inventive algorithm in accordance with the preferred embodiment of the invention are given, two further issues need to be addressed.

First, the inventive algorithm must be implemented over a network with a tree topology. For the purposes here, it is to be noted that a tree topology for the network has already been derived following the above described procedure.

Figure 1B:
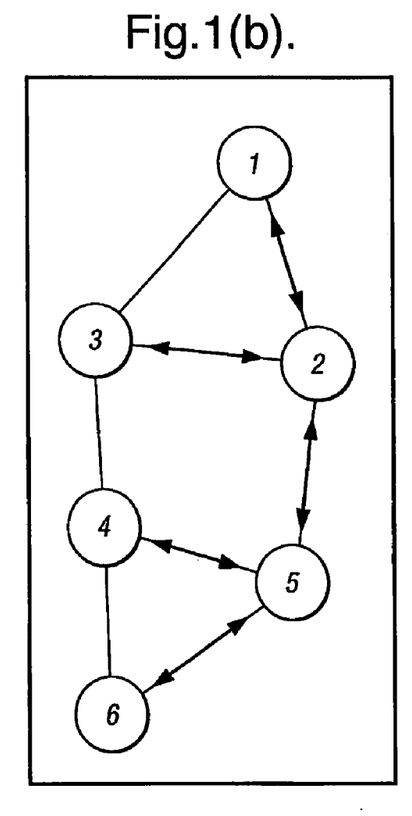

Secondly, as shown in FIG. 1(b), the inventive algorithm requires a model to be associated with a link. This can be handled by storing a model at each end of the link, that can be maintained in a consistent state, provided no messages are lost. Therefore, a key requirement of the inventive algorithm described below is that it needs to be implemented over a lossless network protocol such as TCP.

The steps involved in the inventive algorithm of the preferred embodiment are now given below. The particular implementation of these steps is to be understood with particular reference to the flow diagram of the algorithmic procedure of FIGS. 4(a) to (c) and with particular reference to the network example of FIG. 6 that may be employed in the invention.

The algorithm steps of the preferred embodiment are now described. Note that at each node of the network, two different kinds of asynchronous algorithm are run, one that handles input of new information to the node model (called "Node Protocol"), and another that manages each link (called "Link Protocol: Send" at the originating node, and "Link Protocol: Receive" at the receiving node).

Figure 4:
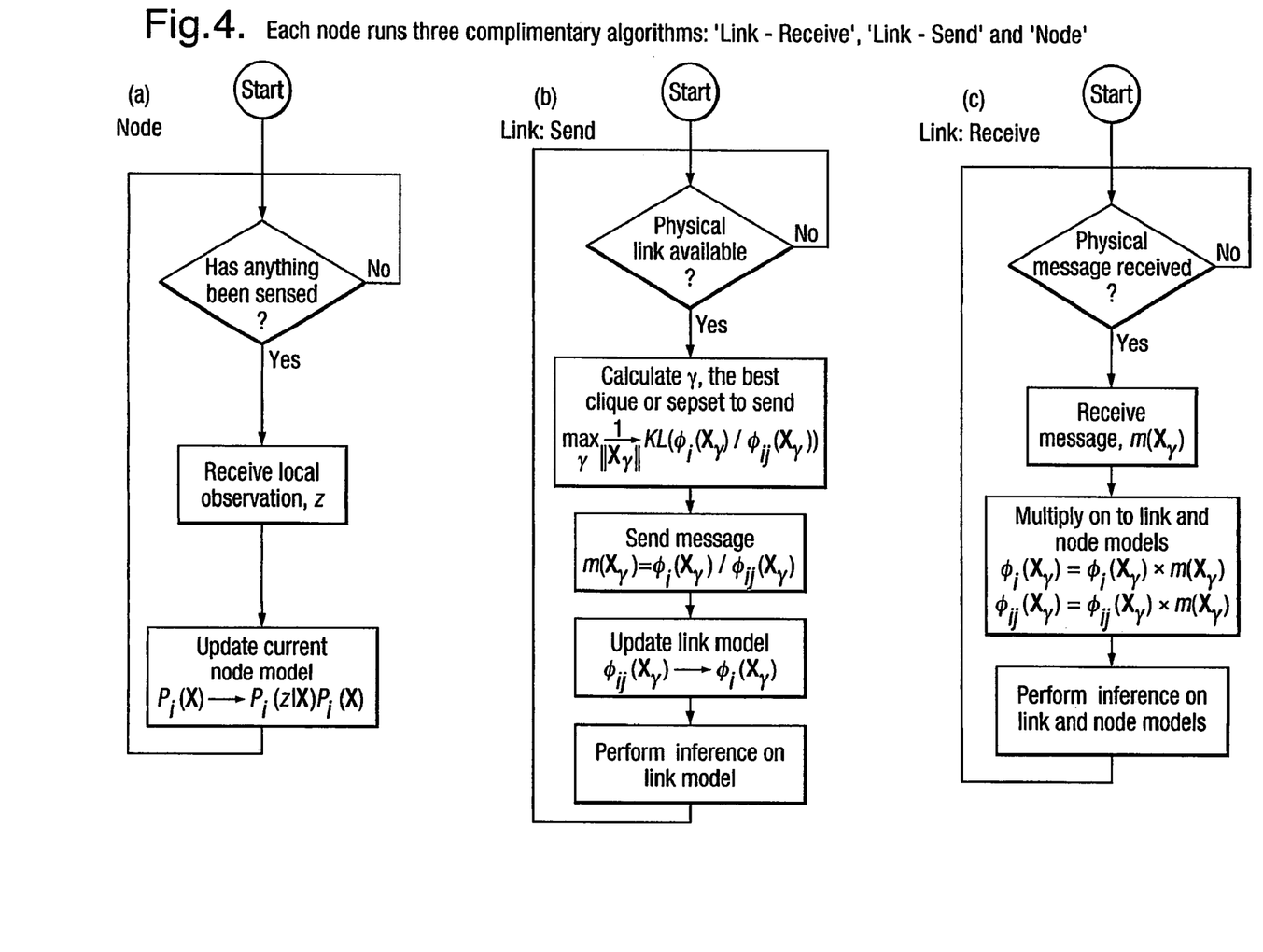
FIGS. 4(a) to (c) are flow diagrams of the procedure according to an embodiment of the present invention.

"Node Protocol" Steps (See FIG. 4(a))
1. A node (Node 1, 2, 3) in the network 30 waits to be interrupted in response to a command signal which is activated by an associated external sensor when anything is sensed in the neighbouring node environment.
2. Newly sensed information manifest as a local observation is then fed into the node (Node 1,3)—this is made possible by the node algorithm being run at the node over the incoming observations and the node model. This activity applies to Nodes 1, 3 shown in FIG. 6 (note that no observations are shown to go into Node 2 of FIG. 6 because this node does not have any associated external sensor).
3. The corresponding current local node model $P_i$ (X) is updated to take account of step 2.
4. Return to Step 1.
Turning to the link model, this has two threads of control: one each for sending and receiving messages.

Link Protocol: Send" Steps (at an Originating Node—See FIG. 4(b))
1. Wait for detection of physical node link (LINK 1, LINK 2) availability in the network 30.
2. In response to activation of a command signal which indicates link availability, calculate index γ for finding the best clique or sepset to send across the node link by means of the established KL divergence metric:

$$\max_\gamma \frac{1}{\|X_\gamma\|} KL(\phi_i(X_\gamma) | \phi_{ij}(X_\gamma))$$

This step requires a one-to-one assignment of members $\phi_i$ of the associated node distribution to members $\phi_{ij}$ of the associated node link distribution. Thus, this step selects that particular combination of probability factors (i.e. γ, the best clique/sepset) amongst the various possible combinations of probability factors associated with the node link and the linked nodes which provides the largest calculated contribution to the KL divergence metric. Note that in this calculation step γ indexes both cliques and sepsets. Note also that the decision to send the selected γ best clique or sepset across the link is based upon the KL divergence metric per bit.

3. Send message (i.e. the selected best clique/sepset)

$$m(X_\gamma) = \phi_i(X_\gamma)/\phi_{ij}(X_\gamma)$$

across link from the originating node to the other (receiving) node.

4. Update the corresponding node model and node link model to take account of step 3.

$$\phi_{ij}(X_\gamma) \rightarrow \phi_i(X_\gamma)$$

i.e. update probability distribution $P_{ij}$ with clique from probability distribution $P_i$.

5. Perform inference step in the $P_{ij}$ probability distribution so as to take account of the above steps, thereby ensuring that the total model is self-consistent.
6. Return to Step 1.

"Link Protocol: Receive" Steps (at a Receiving Node—See FIG. 4(c))
1. Wait until physical message is received at receiving node.
2. Receive the selected message $m(X_\gamma)$ in response to activation of command signal indicating when physical message is received.
3. Update the corresponding node model and node link model at the receiving node to take account of step 2.

$$\phi_i(X\gamma) = \phi_i(X_\gamma) \times m(X_\gamma)$$

$$\phi_{ij}(X_\gamma) = \phi_{ij}(X_\gamma) \times m(X_\gamma)$$

i.e. multiply onto message onto both the corresponding $P_i$ and $P_{ij}$ probability distributions by multiplying onto appropriate cliques.

4. Perform inference step in the corresponding $P_i$ and $P_{ij}$ probability distributions so as to take account of the above steps, thereby ensuring that the node and link models for the receiving node are self consistent.
5. Return to Step 1.

The above algorithm steps in this described embodiment are repeated in a series of time steps as an iterative procedure until an optimal solution (convergence) is reached. In this embodiment, the node protocol, link protocol send and link protocol receive steps are performed asynchronously by means of running complimentary algorithms at each node in the network.

In this embodiment, the node models and the node link models are based on a Bayesian network probabilistic model.

The above algorithm works for solving information distribution problems in various areas e.g. in commerce, industry, and in relation to autonomous system applications.

Referring now to FIGS. 5(a) to (c) and FIG. 6, there are shown examples of networks that may be employed in the present invention.

Figure 5A:
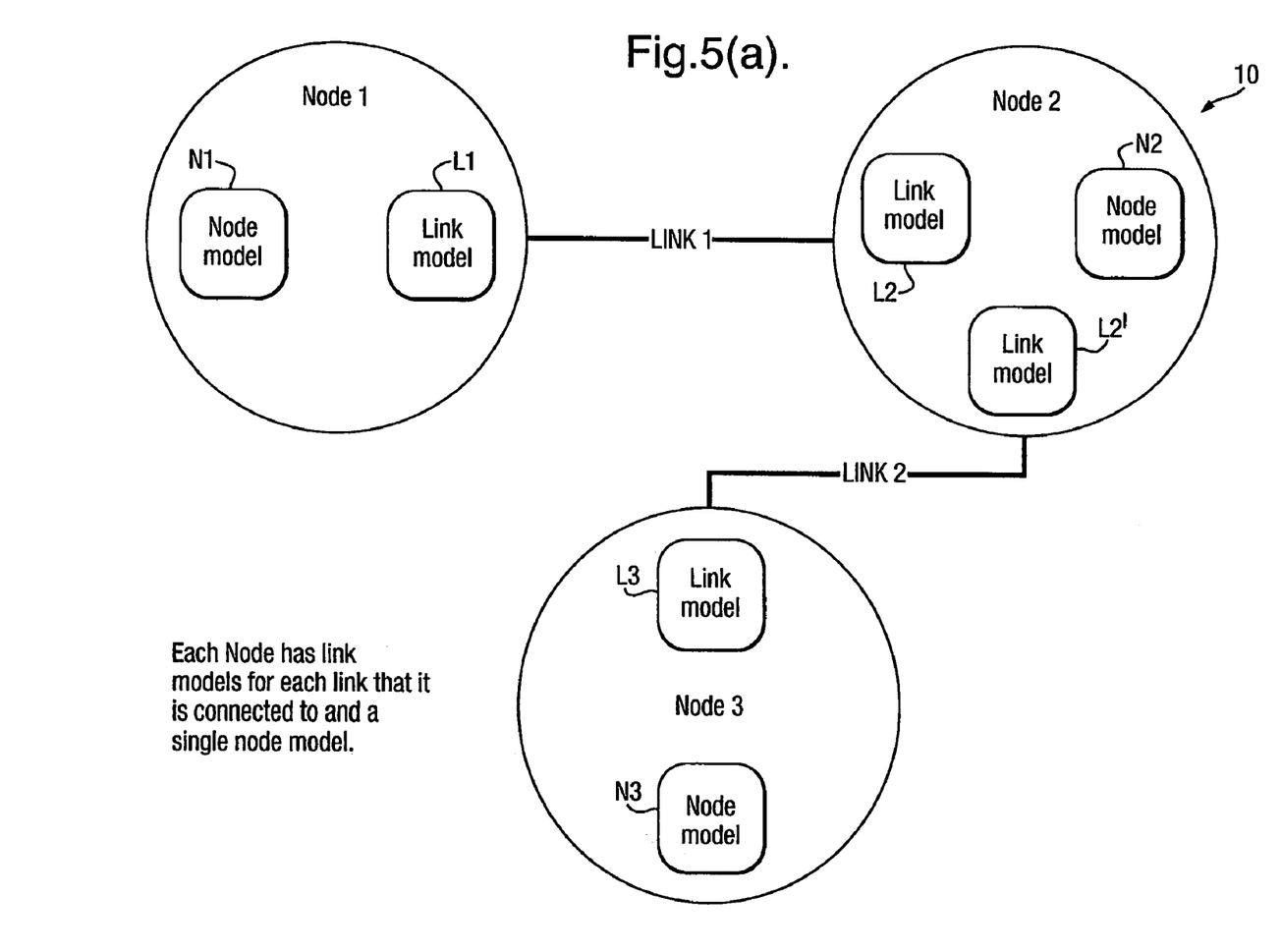
FIGS. 5(a) to (c) and FIG. 6 are examples of networks that may be employed in the present invention.

As shown in FIG. 5(a), the network 10 has three nodes (Nodes 1, 2, 3). Node 1 has a single node model N1 and a single link model L1 at its edge. Node 2 has a single node model N2 and two link models L2, L2' at two separate edge locations. Node 3 has a single node model N3 and a single link model L3 at its edge. Node 1 is linked to Node 2 via Node Link 1. Node 2 is linked to Node 3 via Node Link 2. These Links could be radio wireless links for example (as would be appreciated by a skilled person in the art). Thus each node has link models for each link that it is connected to and a single node model. Each of the nodes has computer processing means (not shown) with Node protocol and Link protocol send/receive algorithm means for performing the above described algorithm steps.

In use of the method of the invention over this described network 10, it is necessary that the method is implemented over a lossless network protocol such as TCP. It is also to be appreciated that this network is required to have a tree topology representation in order that the invention can work.

Figure 5B:
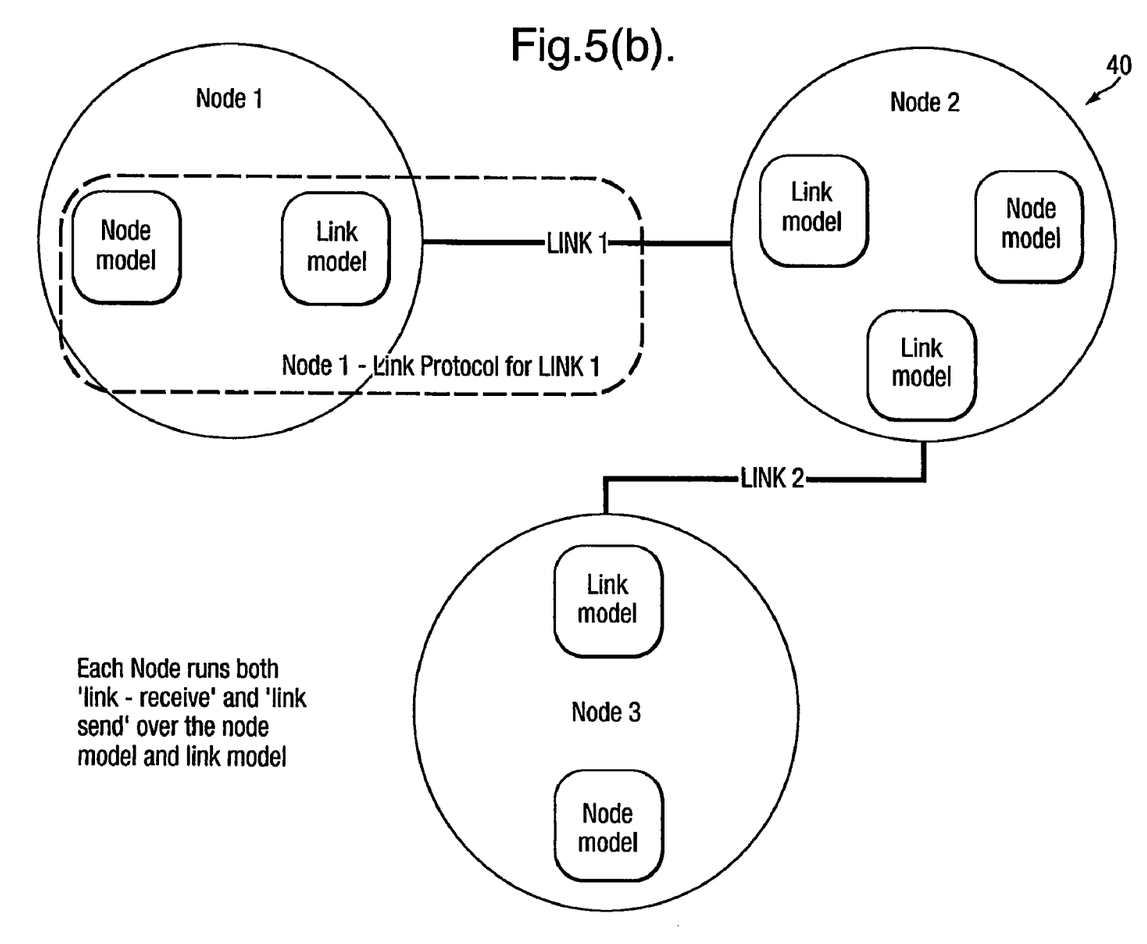

The network 40 shown in FIG. 5(*b*) is equivalent to that of FIG. 5(*a*) but shows additionally in dashed line the link protocol for Link 1 for Node 1. Thus, in use of the method of the invention over this network, each node in the network is envisaged to run both Link-receive and Link-send algorithm steps (as described above) over the associated node model and link model.

Figure 5C:
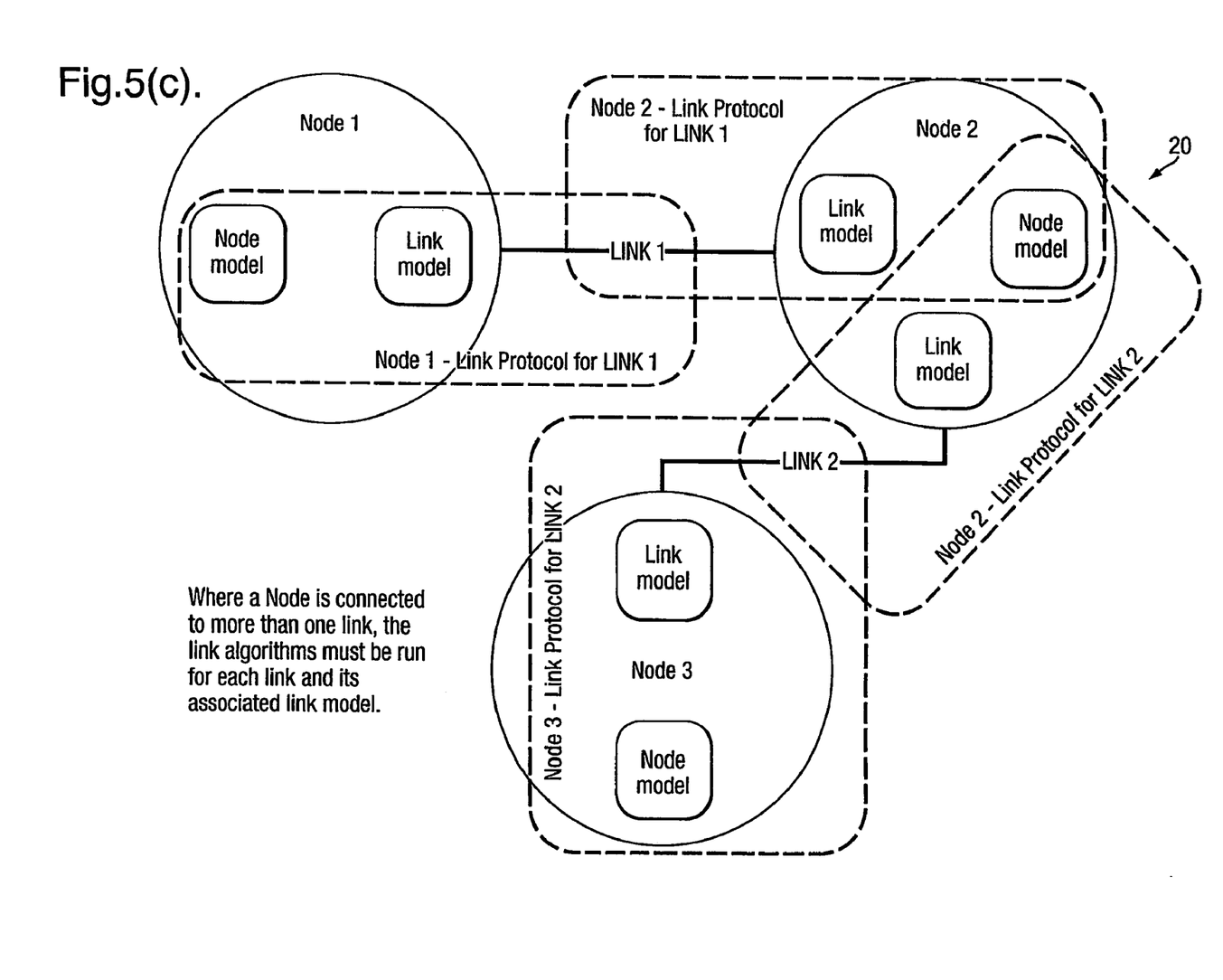

The network 20 shown in FIG. 5(*c*) is also equivalent to that of FIG. 5(*a*) but shows additionally in dashed line the Link protocol for Link 1 for Node 1, the Link protocols for Links 1 and 2 for Node 2 and the Link protocol for Link 2 for Node 3. Note also that in this network, where a node is shown to be connected to more than one Link, the inventive Link algorithms are required to run for each Link and its associated Link model.

Figure 6:
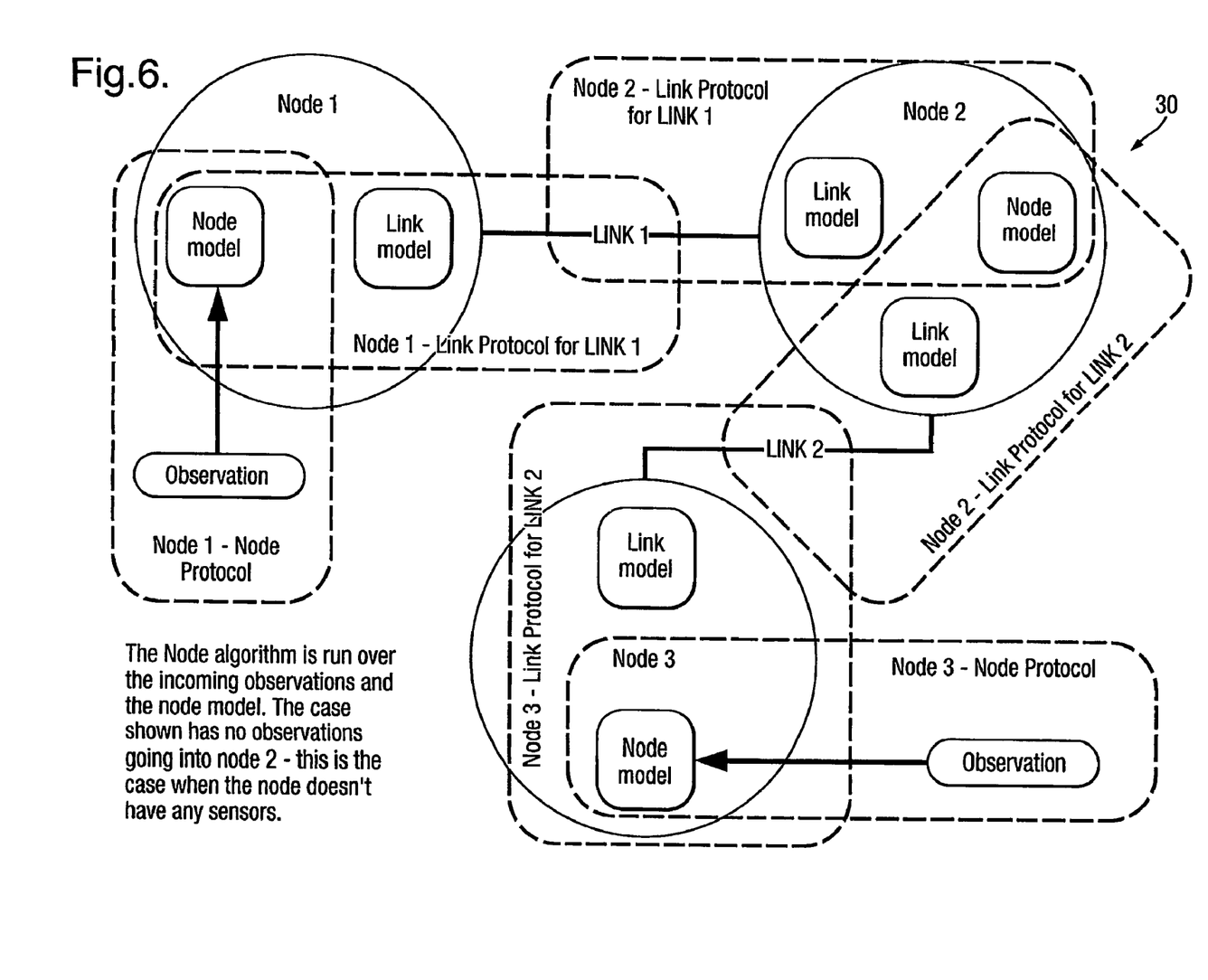

The Network 30 shown in FIG. 6 is equivalent to that of FIG. 5 (*c*) but shows additionally the input of local observations into Nodes 1 and 3 by virtue of each of these Nodes having associated sensor means (not shown) which in use sense changes in the neighbouring node environment. No observations are fed into Node 2—this node does not have an associated sensor. In use of the method of the invention over this network, each node in the network runs both link-receive and link-send algorithm steps (as described above), and the node protocol algorithm (as described above) runs over the incoming observations and the respective node models at Nodes 1, 3.

Experiments and Results

A series of simple experiments were conducted to validate the invention. The aim of these experiments was to demonstrate:

increased accuracy in resource constrained environments;
lower resource usage in unconstrained environments;
when compared to the On-network protocol.

Benchmarks: A discrete event simulation was constructed implementing the two protocols and, for comparison, a centralised reference solution.

For the On-Network protocol, observations are propagated across the network from the originating node. If necessary, these are queued at the nodes (using a FIFO discipline) until sufficient link capacity becomes available.

Experimental Task: The experimental task was designed to be as simple as possible:

the network consisted of two nodes connected by a single link;
a simple discrete Bayesian network (Asia) was instantiated in a particular state (i.e. corresponding to a particular instantiation of its variables) to provide a "true state" model;
a fixed observation stream consisting of varying quality observations was generated from the true state model, with exponentially distributed transmission times;
a copy of the Asia network was instantiated without any evidence at each node;
observations were entered into each of the three systems at the appropriate time during the simulation. Over time, as more accumulated evidence is generated at each node, the distribution in each experiment should asymptotically approach the true state;
this was repeated for three different link rates: 0.25, 1 and 2.5. These are measured relative to the rate corresponding to an average full occupancy of the On-Network protocol.

Experimental Measures: Two experimental measures were gathered for each of the three tasks:

KL divergence of three solutions and the true state model vs time;
the link occupancy as a function of time.

Figure 7A:
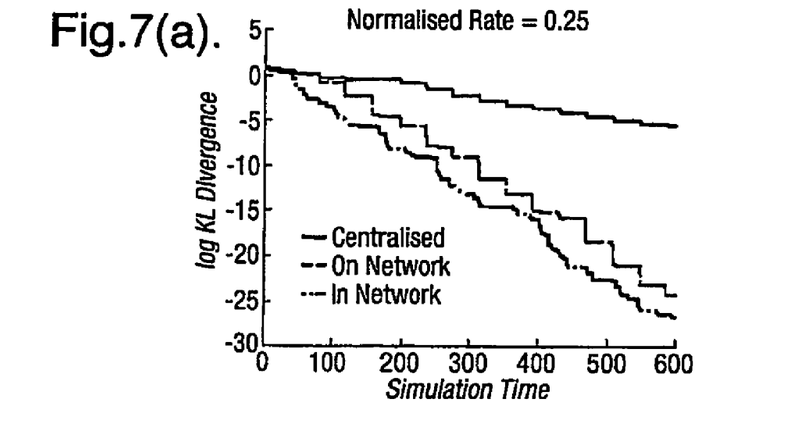
FIGS. 7(a) to (c) are graphs indicating the comparative quality of In-Network, On-Network and centralised solutions, as measured using the KL divergence metric function between the distributed solution and the true state, for link rates of (a) 0.25, (b) 1.0 and (c) 2.5, where 1.0 corresponds to information being generated at a rate that would utilise all of the link.
Figure 7B:
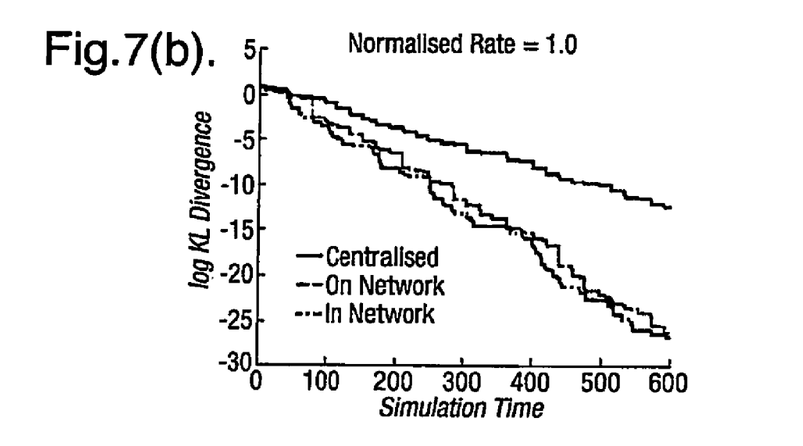
Figure 7C:
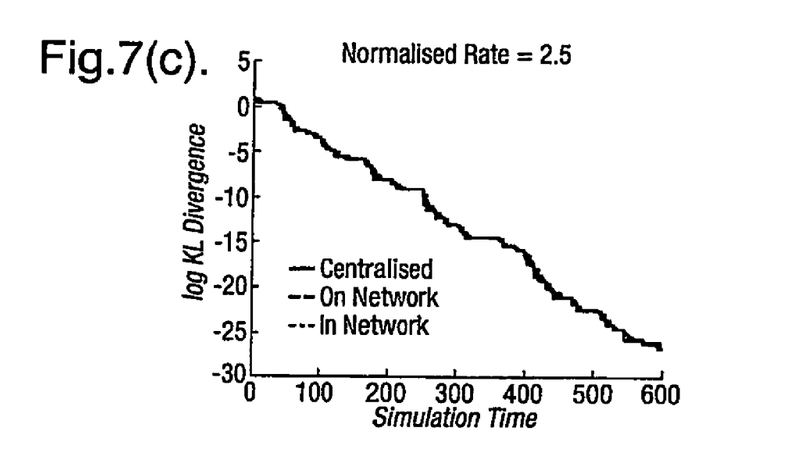

Experimental Results: FIG. 7 shows the KL divergence versus simulation time of all three protocols, for three different link rates. The Reference solution lower bounds the KL divergence vs time representing the best it is possible to do with the given data. One can see that the In-Network protocol outperforms On-Network in terms of accuracy at the lower link rates shown, whereas for higher link rates, the performance of the two solutions is statistically identical.

Table 1 demonstrates that at higher link rates the In-Network protocol uses less resource than On-Network, whereas at lower link rates, both protocols utilise the full link bandwidth.

| Normalised Link Rate | Link Occupancy: On Network | Link Occupancy: In Network |
|---|---|---|
| 0.25 | 1 | 1 |
| 1.00 | 0.97 | 0.80 |
| 2.50 | 0.44 | 0.40 |

Discussion and Proposed Further Work

The inventors have developed an efficient In-Network solution for minimising differences between probability distributions held at each node, providing a foundation for consistent decision making in a network system. Furthermore, it allows the decision making systems to control the rate of transmission of messages without losing information, providing a means to operate flexibly in different EMCON environments. Efficiency is achieved by using an intelligent decision making algorithm that takes into account differences in information between nodes. It is possible to show that (at convergence), the algorithm optimises the global objective $$U(X) = \sum_{ij} U(X) = \sum_{\{ij\}} \log\{P_i(X)/P_{ij}(X)\},$$

which is a sum over all pairs of connected nodes $\{ij\}$.

It has been demonstrated that the algorithmic procedure of the embodiment of the invention:

converges more rapidly (i.e. uses information more efficiently) when bandwidth is constrained than the equivalent On-Network case;
uses less bandwidth than the On-Network algorithm when bandwidth is unconstrained.

In practice, these features allow a system to operate with the same performance as for the On-Network case but more covertly (i.e. transmitting less) or more efficiently (using higher latency, cheaper, communications system).

A feature of the above described inventive algorithm is that it operates over a spanning tree that is overlaid on the basic communications infrastructure. To make this system robust, a mechanism is required to be provided for creating and maintaining spanning trees. The algorithm should: converge rapidly; be robust to loop formation; generate optimal or close to optimal spanning trees; be stable (i.e. only reorganise when necessary) in the face of topology changes of the underlying network, caused by the introduction of new nodes, node movement or node and link failure. Therefore as a next step, an investigation into the performance of distributed spanning tree algorithms against these requirements (see References [10, 11, 12]) is proposed.

The inventors have thus demonstrated: an inventive technique for decision making that can be used with complex, situation specific models in a network; that minimises information differences between the nodes; that satisfies (in the converged case) a global objective function.

Having thus described the present invention by reference to a preferred embodiment, it is to be appreciated that the embodiment is in all respects exemplary and that modifications and variations are possible without departure from the spirit and scope of the invention. For example, whilst in the preferred embodiment the Kullback-Leibler divergence metric function is used, other types of metric function could be used instead as a measure of the difference between the node models and the node link models. Furthermore, whilst in the described embodiment the node models and node link models are based on a Bayesian network probabilistic model, other kinds of probabilistic model (i.e. ones which can be parameterised) could be used as a suitable basis model instead—for example, the Markov Random field probabilistic model could be readily used as a suitable basis model. It is to be also appreciated that this invention could find utility in many applications in both centralised networks and in distributed networks, provided that it is possible to derive an appropriate tree topology representation of the network.

LIST OF REFERENCES

[1] J. Liu, J. Reich, and F. Zhao. Collaborative in-network processing for target tracking. *EURASIP, Journal on Applied Signal Processing*, 4:378-391, 2003.

[2] David J. C. MacKay. *Information Theory, Inference, and Learning Algorithms*. Cambridge University Press, 2003. Available from http://www.inference.phy.cam.ac.uk/mackay/itila/.

[3] Peter Kall and Stein W. Wallace. *Stochastic Programming*. John Wiley and Sons, 1994.

[4] Martin L. Puterman. *Markov Decision Processes*. John Wiley and Sons, 1994.

[5] Judea Pearl. *Probabilistic Reasoning in Intelligent Systems: Networks of Plausible Inference*. Morgan Kaufman, San Mateo, Calif., 1988.

[6] Mark A. Paskin and Carlos E. Guestrin. Robust probabilistic inference in distributed systems. *In Proceedings of the Twentieth Conference on Uncertainty in Artificial Intelligence* (UAI-04), 2004.

[7] Y. Xiang and F. V Jensen. Inference in Multiply Sectioned Bayesian Networks with extended Shafer-Shenoy and lazy propagation. In Kathryn B. Laskey and Henri Prade, editors, *Proceedings of the Fifteenth Conference on Uncertainty in modelling Intelligence*, (UAI-99), Stokholm, Sweden, pages 680-687. Morgan Kaufmann, 1999.

[8] Finn V. Jensen. *Introduction to Bayesian Networks*. Springer Verlag, New York, 1997.

[9] S. L. Lauritzen and D. J. Spiegelhalter. Local computations with probabilities on graphical structures and their application to expert systems. *J. Royal Statistics Society B*, 50(2):157-194, 1988.

[10] Mark Paskin and Carlos Guestrin. A robust architecture for distributed inference in sensor networks. Technical Report IRB-TR-03-039, Intel Research, 2004.

[11] Eric Nettleton. *Decentralised Architectures for Tracking and Navigation with Multiple Flight Vehicles*. PhD thesis, University of Sydney, 2003.

[12] R. Gallagher, P. Humblet, and P. Spira. A distributed algorithm for minimum-weight spanning trees. *ACM Transactions on Programming Languages and Systems*, 5:66-77, January 1983.

The invention claimed is:

1. A method of decision making that is applied in a network comprising a plurality of nodes, each node having means for receiving and sending information and means for processing information, and each node being linked to selected other nodes of the network, the method comprising:
   (i) providing a tree representation of the nodes and establishing therefrom for each of the nodes (a) a node model comprising a probability distribution of node component probability factors to represent the node state and (b) at least one node link model comprising a probability distribution of link component probability factors to represent the state of each node link associated with each node via which information can be communicated to selected other nodes,
   (ii) in response to receiving new information at one or more of the nodes, updating the corresponding node models that are maintained at said one or more of the nodes,
   (iii) in response to detecting the availability of a node link which links a node pair in the network, selecting a combination of node component probability factors and link component probability factors associated with said node pair and its node link by calculating the contributions that various possible combinations of node component probability factors and link component probability factors would make to a predetermined function which measures the difference between the node models and the node link models for said node pair and its node link and by selecting that combination of probability factors amongst the various possible combinations of probability factors which provides the largest calculated contribution to said predetermined function,
   (iv) transferring said selected combination of node component probability factors and link component probability factors from the originating node to the receiving node via said node link thereby reducing information differences between the nodes and updating the corresponding node models and the node link models that are maintained at the nodes, and
   (v) independently reconciling the node models and the node link models associated with the nodes in the network so as to take account of the transferring step (iv).

2. The method as claimed in claim 1 including a step (vi) of repeating the aforesaid steps (i), (ii), (iii), (iv) and (v) in a series of time steps as an iterative procedure.

3. The method as claimed in claim 1, wherein said step (ii) and said steps (iii) to (v) are effected in accordance with different procedures asynchronously.

4. The method as claimed in claim 1, wherein a plurality of node links are provided at a first node and single node links are provided at a second and third node, the first node being linked separately to the second and third nodes via node links, said steps (iii) to (v) being further effected contemporaneously for each of the node links and associated node link models.

5. The method as claimed in claim 1, wherein said predetermined function is the Kullback-Leibler (KL) divergence metric function.

6. The method as claimed in claim 1, comprising a step of basing the node models and the node link models on a Bayesian network probabilistic model.

7. The method as claimed in claim 1, comprising a step of basing the node models and the node link models on a Markov Random Field probabilistic model.

8. The method as claimed in claim 1 implemented over a lossless TCP network protocol.

9. A non-transitory computer readable medium having program code stored thereon which when compiled causes a computer at each node in a network that includes a plurality of linked nodes to execute a method of decision making, wherein each node includes means for communicating information and means for processing information, the method comprising:
- (i) providing a tree representation of the nodes and establishing therefrom for each of the nodes (a) a node model comprising a probability distribution of node component probability factors to represent the node state and (b) at least one node link model comprising a probability distribution of link component probability factors to represent the state of each node link associated with each node via which information can be communicated to selected other nodes,
- (ii) in response to receiving new information at one or more of the nodes, updating the corresponding node models that are maintained at said one or more of the nodes,
- (iii) in response to detecting the availability of a node link which links a node pair in the network, selecting a combination of node component probability factors and link component probability factors associated with said node pair and its node link by calculating the contributions that various possible combinations of node component probability factors and link component probability factors would make to a predetermined function which measures the difference between the node models and the node link models for said node pair and its node link and by selecting that combination of probability factors amongst the various possible combinations of probability factors which provides the largest calculated contribution to said predetermined function,
- (iv) transferring said selected combination of node component probability factors and link component probability factors from the originating node to the receiving node via said node link thereby reducing information differences between the nodes and updating the corresponding node models and the node link models that are maintained at the nodes, and
- (v) independently reconciling the node models and the node link models associated with the nodes in the network so as to take account of the transferring step (iv).

10. The method as claimed in claim 2 wherein said step (ii) and said steps (iii) to (v) are effected in accordance with different procedures asynchronously.

11. The method as claimed in claim 3 wherein a plurality of node links are provided at a first node and single node links are provided at a second and third node, the first node being linked separately to the second and third nodes via node links, said steps (iii) to (v) being further effected contemporaneously for each of the node links and associated node link models.

12. The method as claimed in claim 4 wherein said predetermined function is the Kullback-Leibler (KL) divergence metric function.

13. The method as claimed in claim 5, comprising a step of basing the node models and the node link models on a Bayesian network probabilistic model.

14. The method as claimed in claim 5, comprising a step of basing the node models and the node link models on a Markov Random Field probabilistic model.

15. The method as claimed in claim 7 implemented over a lossless TCP network protocol.

16. A non-transitory computer readable medium having program code stored thereon which when compiled causes a computer at each node in a network that includes a plurality of linked nodes to execute a method of decision making, wherein each node includes means for communicating information and means for processing information, the method comprising:
- (i) providing a tree representation of the nodes and establishing therefrom for each of the nodes (a) a node model comprising a probability distribution of node component probability factors to represent the node state and (b) at least one node link model comprising a probability distribution of link component probability factors to represent the state of each node link associated with each node via which information can be communicated to selected other nodes,
- (ii) in response to receiving new information at one or more of the nodes, updating the corresponding node models that are maintained at said one or more of the nodes,
- (iii) in response to detecting the availability of a node link which links a node pair in the network, selecting a combination of node component probability factors and link component probability factors associated with said node pair and its node link by calculating the contributions that various possible combinations of node component probability factors and link component probability factors would make to a predetermined function which measures the difference between the node models and the node link models for said node pair and its node link and by selecting that combination of probability factors amongst the various possible combinations of probability factors which provides the largest calculated contribution to said predetermined function,
- (iv) transferring said selected combination of node component probability factors and link component probability factors from the originating node to the receiving node via said node link over a lossless TCP network protocol thereby reducing information differences between the nodes and updating the corresponding node models and the node link models that are maintained at the nodes, and
- (v) independently reconciling the node models and the node link models associated with the nodes in the network so as to take account of the transferring step (iv).

17. A system for decision making in a network comprising:
a plurality of nodes, each node having means for receiving and sending information;
and means for processing information, and each node being linked to selected other nodes of the network, the system performing the steps of:
- (i) providing a tree representation of the nodes and establishing therefrom for each of the nodes (a) a node model comprising a probability distribution of node component probability factors to represent the node state and (b) at least one node link model comprising a probability distribution of link component probability factors to represent the state of each node link associated with each node via which information can be communicated to selected other nodes,
- (ii) in response to receiving new information at one or more of the nodes, updating the corresponding node models that are maintained at said one or more of the nodes, (iii) in response to detecting the availability of a node link which links a node pair in the network, selecting a combination of node component probability factors and link component probability factors associated with said node pair and its node link by calculating the contributions that various possible combinations of node component probability factors and link component probability factors would make to a predetermined function which measures the difference between the node models and the node link models for said node pair and its node link and by selecting that combination of probability factors amongst the various possible combinations of probability factors which provides the largest calculated contribution to said predetermined function, (iv) transferring said selected combination of node component probability factors and link component probability factors from the originating node to the receiving node via said node link thereby reducing information differences between the nodes and updating the corresponding node models and the node link models that are maintained at the nodes, and (v) independently reconciling the node models and the node link models associated with the nodes in the network so as to take account of the transferring step (iv).

* * * * *